Feb. 22, 1949.  B. FAURE  2,462,373
JOINING AND REGISTERING DEVICE FOR MOLDING BOXES
Filed April 19, 1945
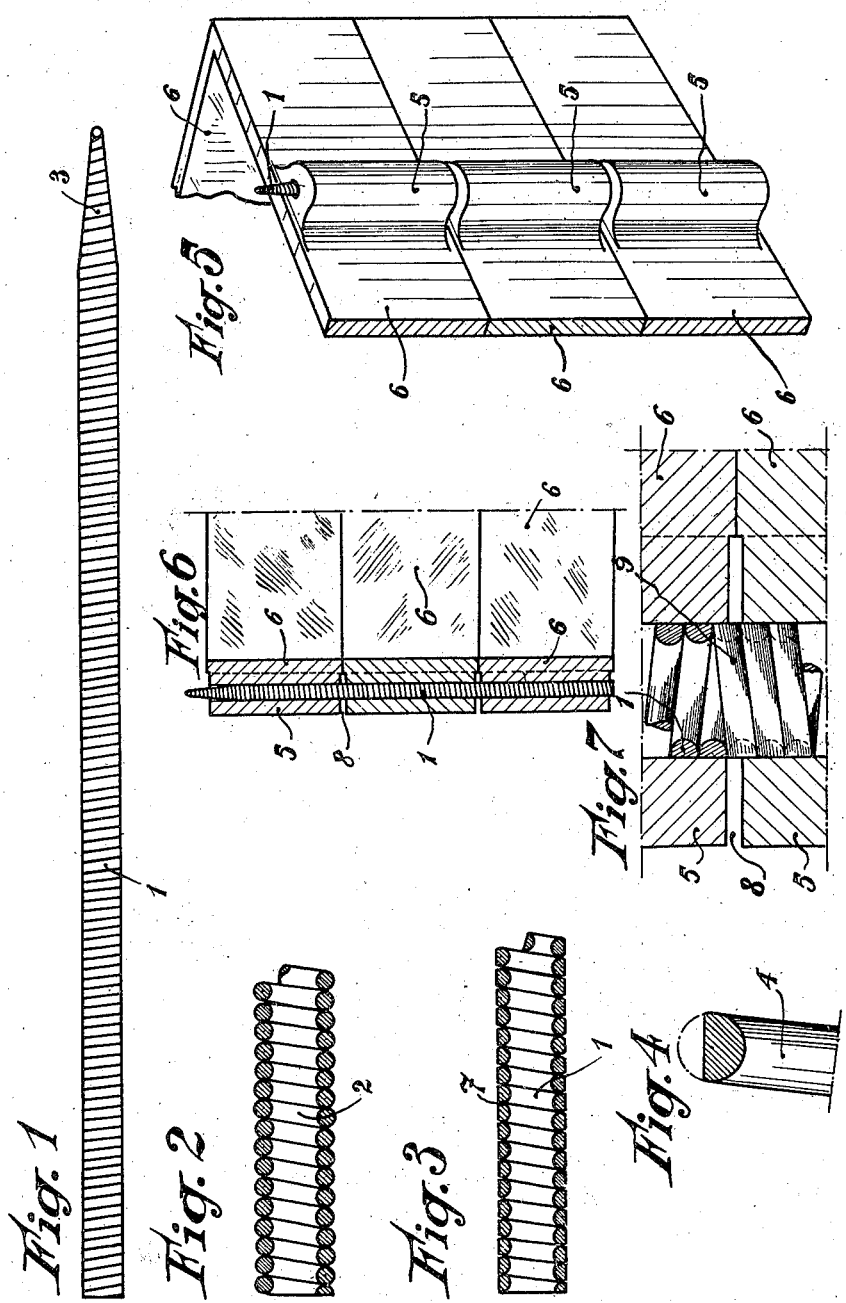
Bernard Faure
By Fraser, Myers & Manley
Atty's Patented Feb. 22, 1949

2,462,373

UNITED STATES PATENT OFFICE 2,462,373

JOINING AND REGISTERING DEVICE FOR MOLDING BOXES

Bernard Faure, Neuilly-sur-Seine, France

Application April 19, 1945, Serial No. 589,105
In France May 31, 1944

3 Claims. (Cl. 22—110)

For joining several moulding boxes in smelting-works, it is customary to provide pins adapted to engage without substantial clearance lugs located on the side-walls of the boxes.

While the lack of clearance is required for accuracy of registration of the moulding boxes with respect to one another, it has a drawback: when the moulding boxes are being assembled or separated, any slight defect of parallelism between two boxes entails for the pins and lugs bending stresses which easily result in breaking the less strong of said members, generally the pins.

It is an object of my invention to provide improvements in moulding boxes whereby the above drawback is removed and the boxes may be handled without special care and without any risk of breaking any parts, or of impairing the accuracy of registration.

According to my invention, the pin instead of being in the form of a solid and rigid or non-resilient stem, is in the form of a spiral spring with contacting coils which is as strongly pre-stressed as possible, and preferably is so machined as to have a perfectly cylindrical outer surface, only broken by a narrow helical groove corresponding to the coil joints. While being sufficiently stiff to provide for joining and registration of moulding boxes such a pin is adapted resiliently to bend without any risk of breaking when submitted to a bending stress.

My invention will be further readily understood from the following description and claims, and from the appended drawings given solely by way of example, and in which:

Fig. 1 is an elevation of my improved pin.

Fig. 2 is a fragmentary axial section of a spring from which said pin is produced.

Fig. 3 is a fragmentary axial section of a preferred form of my pin.

Fig. 4 is an enlarged view of a partial section of pin coil.

Fig. 5 shows a pin cooperating with several moulding boxes.

Fig. 6 is a section corresponding to Fig. 5 and taken in a plane including the axis of the pin.

Fig. 7 is an enlarged portion of Fig. 6.

The resilient pin 1 is obtained from a coil spring 2 the coils of which are held in contact with an elastic force arising from a considerable pre-stress, so that this spring normally exhibits a substantial stiffness, though it can be bent when a flexion force is imposed thereon. Said spring has the required length to act as a pin and is ended by a conical part 3 used to facilitate introduction through the lugs. In making the pin, the outer surface of said spring preferably is cylindrically machined and, if need be, part 3 is conically machined, although this is not absolutely necessary. The coil portion thus removed by grinding may, for example, amount to two-fifths of the diameter of component wire 4 (Fig. 4). The helical groove 7 which separates the outer cylindrical surfaces of the coils is then very narrow.

The resilient pin 1 can be passed through the lugs or eyes 5 of moulding boxes 6, as easily and with the same accuracy as a rigid pin, but it resiliently bends should a box become non-parallel to the others during assembly or disassembly.

Besides, resilient pins permit provision of long lugs whereby the bores therein suffer less wear so that the life of the moulding boxes is increased. This lengthening of bores would not be feasible with rigid pins as it would increase the risk of jamming of the pins, hence the risk of breaking said pins. With non-bendable pins, lengthened lugs would not serve the purpose aimed at.

With resilient pins 1 it is preferable in all respects to leave between lugs 5 of contiguous boxes, only intervals 8 just sufficient for accommodation of a few grains of sand, if any (Figs. 6 and 7). The best results are obtained by choosing the ratios between the diameter of the pin, the diameter of the component wire and the height of clearance 8, in such a manner that the coil 9 (Fig. 7) which happens to cover said clearance bears, at two diametrically opposed points on adjacent end portions of the lugs 5, in order to withstand horizontal shearing stresses.

I do not intend to be limited to the precise details shown or described as other modifications may be contemplated within the scope of my invention; particularly the component wire for spring 2 may have a square section instead of a round section.

What I claim is:

1. In an assembly of plural moulding boxes or the like, each of substantial depth, registering means for said boxes comprising lugs thereon of lengths approximating the depths of their related boxes and having longitudinal bores of substantially similar diameters, and a helical spring extending coaxially into the said bores; the said lugs, when said boxes are assembled, having adjacent end portions in such close proximity to each other and the coils of said spring being at such pitch that at least two diametrically opposed circumferential points of a single coil of said spring, said single coil is in intimate lateral abutting relationship with both said adjacent end portions of the said lugs whereby to restrict the said lugs and their related boxes against material lateral relative movement.

2. In an assembly of plural moulding boxes or the like, registering means according to claim 1 further characterized in that the outer peripheries of the coils of said spring are substantially cylindrical, thereby affording a larger area for the contact of such a single coil with the interior surfaces of the bores at the said adjacent end portions of said lugs.

3. Alignment means for plural separate relatively thick members of apparatus, said means comprising portions of said members having bores which are of substantially similar diameters and are arranged to be substantially coaxial when said members are in alignment, a helical spring of substantially uniform diameter throughout a substantial part of its length which is adapted to extend into such bores of plural members to be aligned, the said spring being a tension spring with its coils normally in contact and at least one end of the spring being free of longitudinal restraint whereby to avoid separation of adjacent coils, and the said portions having adjacent faces which, when said members are assembled, are in such close proximity to each other and the coils of said spring being of such pitch that a single coil of said spring is in position to engage opposite sides of the bores of both said portions at said adjacent faces to prevent material departure of said members from alignment.

BERNARD FAURE.

REFERENCES CITED

The following references are of record in the file of this patent:

UNITED STATES PATENTS

| Number | Name | Date |
|---|---|---|
| 683,176 | Ho-Glen | Sept. 24, 1901 |
| 956,621 | Bogenschutz | May 3, 1910 |
| 1,474,862 | Tolbert | Nov. 20, 1923 |
| 1,708,793 | Jones | Apr. 9, 1929 |
| 1,746,233 | Bona | Feb. 11, 1930 |
| 2,138,919 | Herman | Dec. 6, 1938 |
| 2,255,546 | Hansen | Sept. 9, 1941 |

FOREIGN PATENTS

| Number | Country | Date |
|---|---|---|
| 5,799 | Great Britain, 1912 | Dec. 12, 1912 |
| 231,280 | Great Britain | Apr. 2, 1925 |
| 528,173 | Germany | June 26, 1931 |